United States Patent
Schafer et al.

(10) Patent No.: US 9,981,553 B2
(45) Date of Patent: May 29, 2018

(54) WHEEL POWERED ALTERNATOR CHARGING SYSTEM

(71) Applicants: Ronald L. Schafer, Chandler, AZ (US); Gary T. Hotchkiss, Gilbert, AZ (US)

(72) Inventors: Ronald L. Schafer, Chandler, AZ (US); Gary T. Hotchkiss, Gilbert, AZ (US)

(73) Assignee: Ronald L Schafer, Chandler, AZ (US)

( * ) Notice: Subject to any disclaimer, the term of this patent is extended or adjusted under 35 U.S.C. 154(b) by 244 days.

(21) Appl. No.: 15/166,232

(22) Filed: May 26, 2016

(65) Prior Publication Data

US 2016/0347173 A1    Dec. 1, 2016

Related U.S. Application Data

(60) Provisional application No. 62/166,555, filed on May 26, 2015.

(51) Int. Cl.
| | |
|---|---|
| *B60K 25/08* | (2006.01) |
| *H02K 7/18* | (2006.01) |
| *B60H 1/00* | (2006.01) |

(52) U.S. Cl.
CPC .......... *B60K 25/08* (2013.01); *B60H 1/0045* (2013.01); *B60H 1/00428* (2013.01); *H02K 7/1846* (2013.01); *B60Y 2200/148* (2013.01); *B60Y 2400/89* (2013.01)

(58) Field of Classification Search
CPC .. B60K 25/08; B60H 1/00428; B60H 1/0045; H02K 7/1846

USPC ....... 74/13–15; 310/75 R; 290/1 C; 180/53.5
See application file for complete search history.

(56) References Cited

U.S. PATENT DOCUMENTS

| | | | | | |
|---|---|---|---|---|---|
| 1,368,943 | A | * | 2/1921 | Korner | B60K 25/08 |
| | | | | | 74/13 |
| 2,606,624 | A | * | 8/1952 | Chiotte | B60K 25/06 |
| | | | | | 180/53.5 |
| 3,702,570 | A | * | 11/1972 | Stikkers | F16H 7/02 |
| | | | | | 474/113 |
| 3,972,380 | A | * | 8/1976 | Hudson | B60K 1/00 |
| | | | | | 180/65.25 |
| 4,165,466 | A | * | 8/1979 | Stikkers | B60K 25/08 |
| | | | | | 290/3 |

(Continued)

FOREIGN PATENT DOCUMENTS

| | | | | | |
|---|---|---|---|---|---|
| BE | 1002742 A3 | * | 5/1991 | | B60K 25/08 |
| DE | 2923424 A1 | * | 12/1980 | | H02K 7/1861 |

(Continued)

*Primary Examiner* — Burton Mullins (57) ABSTRACT

A wheel powered alternator charging system captures rotational energy of a vehicle wheel, transferring the rotational energy to an alternator to generate electricity. An alternator, a mounting bracket, and a transfer shaft are mounted to a support frame. An input wheel is connected to an existing wheel on the vehicle. The input wheel is connected to the transfer shaft by a first pulley assembly. A second pulley assembly is connected between the transfer shaft and an alternator wheel. As the vehicle wheel rotates, mechanical energy is transferred through the first pulley assembly, the transfer shaft, and the second pulley assembly to the alternator. The mounting bracket is affixed to the vehicle frame.

11 Claims, 8 Drawing Sheets

(56) References Cited

U.S. PATENT DOCUMENTS

| | | | | | |
|---|---|---|---|---|---|
| 4,259,872 | A * | 4/1981 | Chandler | ............... | A01C 19/04 |
| | | | | | 172/106 |
| 5,921,334 | A * | 7/1999 | Al-Dokhi | ................. | B60L 8/00 |
| | | | | | 180/2.2 |
| 6,387,007 | B1 * | 5/2002 | Fini, Jr. | .................... | B60K 6/26 |
| | | | | | 180/65.22 |
| 7,547,980 | B2 * | 6/2009 | Harrison | .................. | F03G 7/08 |
| | | | | | 290/1 R |
| 8,439,140 | B1 * | 5/2013 | Amortegui | ............. | B60K 25/08 |
| | | | | | 180/65.51 |
| 8,723,344 | B1 * | 5/2014 | Dierickx | ................... | F03G 7/08 |
| | | | | | 290/1 R |
| 8,827,022 | B2 * | 9/2014 | Jaberian | ................ | B60K 25/08 |
| | | | | | 180/65.1 |
| 9,415,660 | B2 * | 8/2016 | Koelsch | ............. | B60H 1/00264 |
| 2007/0261902 | A1 * | 11/2007 | Margoudakis | ............ | H02P 7/10 |
| | | | | | 290/1 C |

FOREIGN PATENT DOCUMENTS

| | | | | |
|---|---|---|---|---|
| DE | 102007005797 A1 * | 8/2008 | ............. | B60K 25/08 |
| FR | 2605560 A1 * | 4/1988 | ............. | B60K 25/08 |
| GB | 2325201 A * | 11/1998 | ............. | B60K 25/08 |
| NL | 1008200 C2 * | 9/1999 | ............. | B60K 25/08 |

* cited by examiner

WHEEL POWERED ALTERNATOR CHARGING SYSTEM

The current application claims a priority to the U.S. Provisional Patent application Ser. No. 62/166,555 filed on May 26, 2015.

FIELD OF THE INVENTION

The present invention relates generally to electricity generation. More particularly, the present invention relates to conversion of a vehicle's wheel rotational energy into electrical energy.

BACKGROUND OF THE INVENTION

Semi-tractor trailers have refrigeration units that cool frozen containers at around 35 degrees Fahrenheit or below. Commonly, the refrigeration unit is powered by a diesel engine generator separate from the engine of the tractor unit. As such, these diesel engine generators could take up valuable space and require diesel in order to run. Also, diesel engine generators produce emissions in addition to the emissions already released by the engine of the tractor unit. There exist electrical systems that produce zero emissions and can take up less space than the diesel engine generators. In addition, there exists mounted alternators that can transfer rotational energy from a wheel into electrical energy. However, none of the prior art is specifically adapted to a semi-tractor trailer in order to constantly charge a Lithium battery that's charges a DC motor to power refrigeration units.

It is therefore an objective of the present invention to introduce a wheel powered alternator charging system for use on a semi-tractor trailer in order to power and charge a refrigeration unit. The disclosed invention will allow the constant charging of a Lithium battery that will power a DC motor in order to run the refrigeration unit. The alternator provides sufficient amps to constantly run the motor, and the excess amps will be used to charge the battery. The device can be mounted on the bottom of a semi-tractor trailer and can be attached to one set of the trailer wheels in order to harness the rotational motion energy from the wheel when the truck is being driven. The alternator charging system will be a universal unit with adaptable mounting capabilities. The device will function quietly in order to be used in quiet zones. Also, the device will be able to function in foul weather such as rain and snow. Alternative embodiments of the device can be adapted in order to charge batteries that power any electrical system on a semi-tractor trailer. Overall, the wheel powered alternator charging system promotes the charging of a battery that powers an electrical system for a refrigeration unit on a semi-tractor trailer.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

In view of the aforementioned problem(s), the present invention is a wheel powered alternator charging system that harnesses energy from the rotation of a semi-tractor trailer wheel and converts the mechanical rotational energy into electrical energy through a system of pulleys and alternators. The design allows the continuous charging of a Lithium battery that powers a DC motor that runs a refrigeration unit on a semi-tractor trailer. The alternator provides sufficient amps to run the DC motor, and the excess amps charges the battery. The device allows zero emission charging of an electrical system. The wheel powered alternator charging system can be adapted for use in different electrical systems (not specifically refrigeration units) and can be configured for mounting on different semi-tractor trailers on different sets of trailer wheels. The electrical system is quiet enough to be used in quiet zone areas and is durable in order to work well in any foul weather such as snow. Before explaining at least one embodiment of the present invention in detail, it is to be understood that the invention is not limited in its application to the details of the components and arrangements as described or illustrated. The invention is capable of other embodiments and of being utilized and carried out in various ways. It is also to be understood that the phrasing and terminology employed herein are for the purpose of description and should not be regarded as limiting. As such, the present invention is primarily used for the purpose of charging an electrical system by means of a system of pulleys, belts, and an alternator attached to one set of wheels of a semi-tractor trailer.

Referring to FIGS. 1-5, the preferred embodiment of the present invention generally comprises a support frame 1, a mounting bracket 2, an alternator 3, an input wheel 4, a pulley system of a first pulley assembly 5 and a second pulley assembly 6, a transfer shaft 7, at least one shaft support 8, and at least one bearing 9.

The support frame 1 is an arrangement of structural members that provides support and arrangement for the majority of the components of the present invention. The main support frame 1 is the component that houses the components and is attached to the underneath of a semi-tractor trailer or other vehicle. The material of the support frame 1 is not of specific importance to the present invention, so long as the support frame 1 is sufficiently strong enough to withstand the forces and stresses of supporting the rest of the components of the present invention and those encountered during operation. In one embodiment, the components of the main frame are welded together. However, in alternative embodiments, the components of the support frame 1 can be assembled or attached by different means such as nuts and bolts.

The alternator 3 may be any brand, model, type, shape, size, or configuration of alternator 3 or other device capable of generating electricity by converting rotational energy into electrical energy which possesses the characteristics, specifications or other traits sufficient to facilitate the spirit and purpose of the present invention. In one embodiment, the alternator 3 is a brushless 51 volt, 280 amp alternator 3. In other embodiments, other relevant and useful alternators may be utilized. The alternator 3 comprises an input shaft, to which an alternator wheel 31 is connected to be used with the pulley system. As the alternator wheel 31 turns, so does the input shaft, generating electricity. The alternator 3 is mounted to the support frame 1 through any useful means. In one embodiment, the alternator 3 is mounted to the support frame 1 by two alternator 3 stand mounts. In one embodiment, the alternator 3 stand mounts have a lower base portion and an upper circular portion, the upper circular portion encircling the alternator 3 to hold the alternator 3 in place. In one embodiment, the energy from the alternator 3 is used to charge a battery that powers a motor that runs a refrigeration unit.

The mounting bracket 2 enables the present invention to be mounted underneath a vehicle in order to connect the present invention to a wheel of the vehicle in order to capture the rotational energy of the vehicle's wheel to be converted into electrical energy utilizing the present invention. The mounting bracket 2 is connected to the support frame 1 opposite the pulley system. In various embodiments, the mounting bracket 2 may be connected to the support frame 1 in any useful location.

The input wheel 4 is a circular frame that is attached to the vehicle wheel to facilitate capture of the rotational energy of the vehicle wheel for transfer to the alternator wheel 31 through the pulley system. The pulley system functions to capture the rotational energy of a vehicle wheel to be transferred to the alternator 3. In various embodiments, the pulley system may comprise various pulley arrangements, but the pulley system comprises at least one pulley assembly. Various embodiments may utilize more than one pulley assembly, such as, but not limited to, two pulley assemblies, three pulley assemblies, or more than three pulley assemblies. More particularly, in one embodiment, the pulley system comprises a first pulley assembly 5 and a second pulley assembly 6.

The first pulley assembly 5 is rotationally engaged between the input wheel 4 and the transfer shaft 7, and the second pulley assembly 6 is rotationally engaged between the alternator wheel 31 and the transfer shaft 7 opposite the first pulley assembly 5 along the transfer shaft 7. Thus, the input wheel 4 is rotationally engaged with the alternator wheel 31 through the first pulley assembly 5, the transfer shaft 7, and the second pulley assembly 6.

Each of the at least one support shaft is connected to the support frame 1, and each of the at least one bearing 9 is connected within one of the at least one shaft support 8. The transfer shaft 7 is rotationally engaged within each of the at least one bearing 9, so that the transfer shaft 7 is supported on the support frame 1 by the at least one bearing 9 and the at least one shaft support 8. More particularly, the at least one shaft support 8 comprises a first shaft support 81 and a second shaft support 82, and the at least one bearing 9 comprises a first bearing 91 and a second bearing 92. The first bearing 91 is connected within the first shaft support 81, and the second bearing 92 is connected within the second shaft support 82. The first bearing 91 and the second bearing 92 internally receive the transfer shaft 7, supporting the transfer shaft 7 and reducing rotational friction of the transfer shaft 7.

Thus, the input wheel 4, being affixed to the vehicle wheel, is driven at the same angular speed as the vehicle wheel. As the input wheel 4 turns, the first pulley assembly 5 is driven, in turn rotating the transfer shaft 7, the second pulley, and finally the alternator wheel 31. A first axis of the input wheel 4, a second axis of the transfer shaft 7, and a third axis of the alternator wheel 31 are all oriented parallel to each other for efficient transfer of rotational energy from the input wheel 4 to the alternator wheel 31.

In one embodiment of the present invention, the support frame 1 comprises an upper portion 11, a lower portion 12, and a vertical portion 13. The upper portion 11 is perpendicularly connected to the vertical portion 13, and the lower portion 12 is perpendicularly connected to the vertical portion 13 opposite the upper portion 11 along the vertical portion 13, generally forming a right-angled zig-zag shape, with two opposing 90-degree alternate interior angles, and with the upper portion 11 being oriented parallel to the lower portion 12, vertically separated by the vertical portion 13. It is contemplated that the aforementioned geometrical relations are not necessarily required in all embodiments, however, and alternate configurations for the support frame 1 may be utilized as desired or required for a given application or situation. The alternator 3 is mounted to the upper portion 11. Each of the at least one shaft support 8 is perpendicularly connected to the lower portion 12. The mounting bracket 2 is connected to the vertical portion 13 opposite the lower portion 12, vertically between the upper portion 11 and the lower portion 12. Alternatively stated, the mounting bracket 2 is connected to the back side of the vertical portion 13, under the upper portion 11 of the support frame 1. In one embodiment, the support frame 1 further comprises a plurality of support gussets 14 that are connected between the upper portion 11, the vertical portion 13, and the lower portion 12 to provide structural integrity to the support frame 1.

More specifically in reference to the pulley system, in one embodiment, the first pulley assembly 5 comprises a first pulley belt 51 and a first pulley wheel 52, while the second pulley assembly 6 comprises a second pulley belt 61 and a second pulley wheel 62. The first pulley wheel 52 is concentrically connected to the transfer shaft 7, and the first pulley belt 51 is operatively connected between the input wheel 4 and the first pulley wheel 52. In one embodiment, the first pulley belt 51 is a v-belt, and the input wheel 4 and the first pulley wheel 52 comprise circumferential grooves into which the first pulley belt 51 is fitted, as is commonly known in pulley assemblies. It is contemplated, however, that the first pulley belt 51, the first pulley wheel 52, and the input wheel 4 may be configured for any type of pulley in alternate embodiments. Similarly, the second pulley wheel 62 is concentrically connected to the transfer shaft 7 opposite the first pulley wheel 52 along the transfer shaft 7, and the second pulley belt 61, being a v-belt, is operatively connected between the second pulley wheel 62 and the alternator wheel 31. The first pulley wheel 52 and the second pulley wheel 62 are positioned along the transfer shaft 7 at or near the respective extremities of the transfer shaft 7, with the first shaft support 81 and the second shaft support 82 being positioned along the transfer shaft 7 between the first pulley wheel 52 and the second pulley wheel 62.

Figure 6:
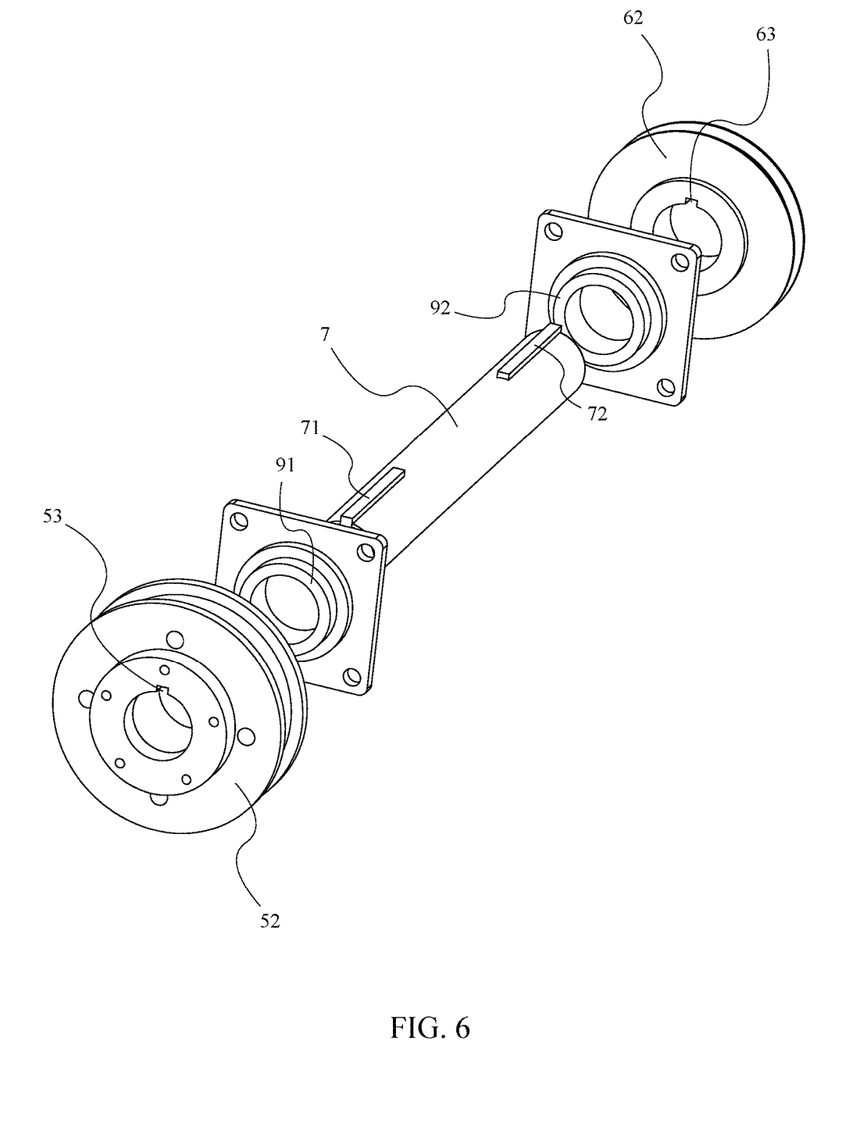
FIG. 6 is an exploded view of the transfer shaft assembly.

The first pulley wheel 52 and the second pulley wheel 62 are rotationally fixed to the transfer shaft 7, so that the first pulley wheel 52, the second pulley wheel 62, and the transfer shaft 7 all rotate at the same angular rate. In one embodiment, the first pulley wheel 52 and the second pulley wheel 62 are rotationally fixed to the transfer shaft 7 through the use of radially off-center grooves and corresponding protrusions. Referring to FIG. 6, in one embodiment, the first pulley wheel 52 comprises a first groove 53, and the second pulley wheel 62 comprises a second groove 63, while the transfer shaft 7 comprises a first protrusion 71 and a second protrusion 72. The first protrusion 71 and the second protrusion 72 are laterally positioned on the transfer shaft 7 axially opposite each other along the transfer shaft 7. The first protrusion 71 and the second protrusion 72 are elongated strips of material traversing parallel to the axis of the transfer shaft. The first groove 53 axially and internally traverses through the first pulley wheel 52, and the second groove 63 axially and internally traverses through the second pulley wheel 62. The first protrusion 71 is positioned within the first groove 53 of the first pulley wheel 52, and the second protrusion 72 is positioned within the second groove 63 of the second pulley wheel 62, thus locking the first pulley wheel 52, the second pulley wheel 62, and the transfer shaft 7 into rotational alignment. The protrusions act as keys, and the grooves act as key holes, being locked together. In one embodiment, the aforementioned configuration is reversed, with the grooves traversing axially into the transfer shaft 7 at the outer surface of the transfer shaft 7, and the protrusions being correspondingly positioned internally to the apertures of the pulley wheels through which the transfer shaft 7 traverses.

The use of the pulley system allows a gear ratio to be designated from the input wheel 4 to the alternator wheel 31. In one embodiment, the diameter of the input wheel 4 has a 20 to 8 ratio to the diameter of the first pulley wheel 52, and the diameter of the second pulley wheel 62 has a 6 to 3 ratio to the diameter of the alternator wheel 31. Thus, the first pulley wheel 52 spins 20 times for each 8 rotations of the input wheel 4, and the alternator wheel 31 spins 6 times for each 3 rotations of the second pulley wheel 62, resulting in five rotations of the alternator wheel 31 for every one rotation of the input wheel 4.

Figure 1:
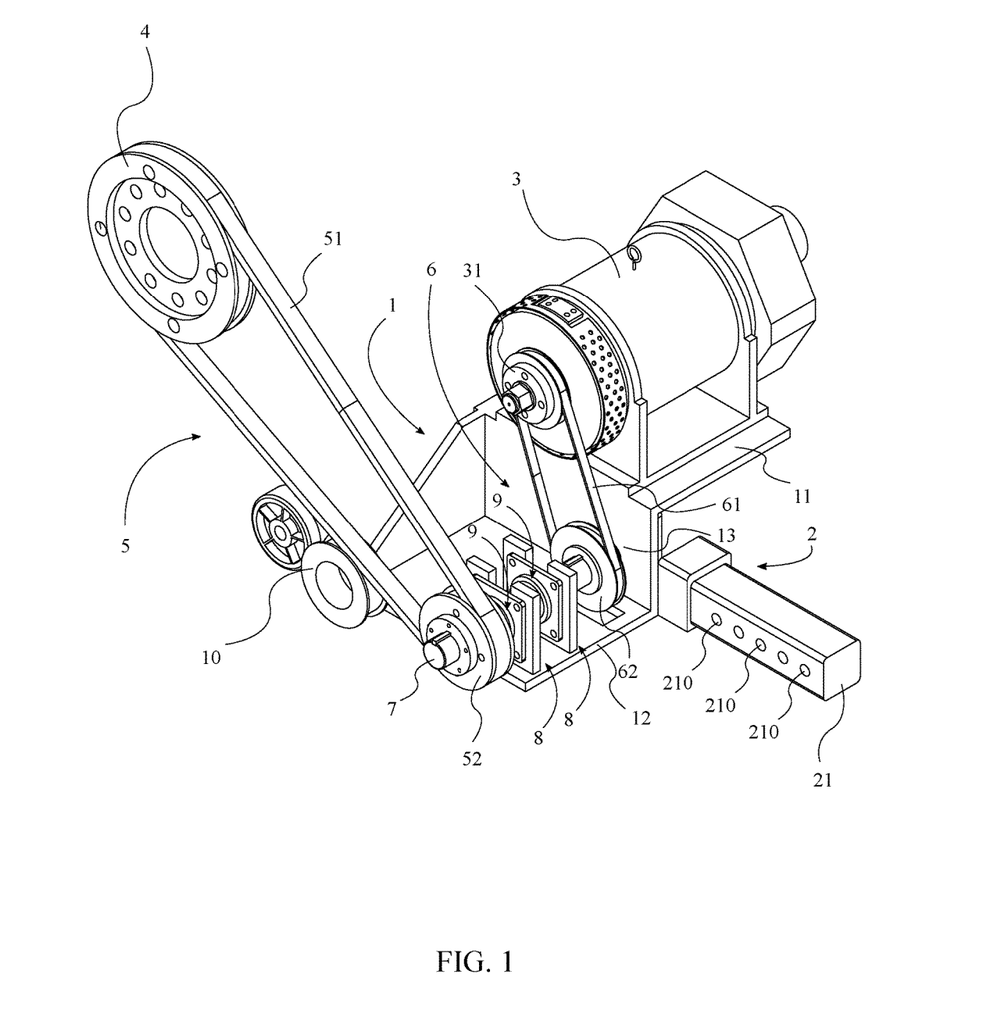
FIG. 1 is an elevated perspective view of the present invention.
Figure 2:
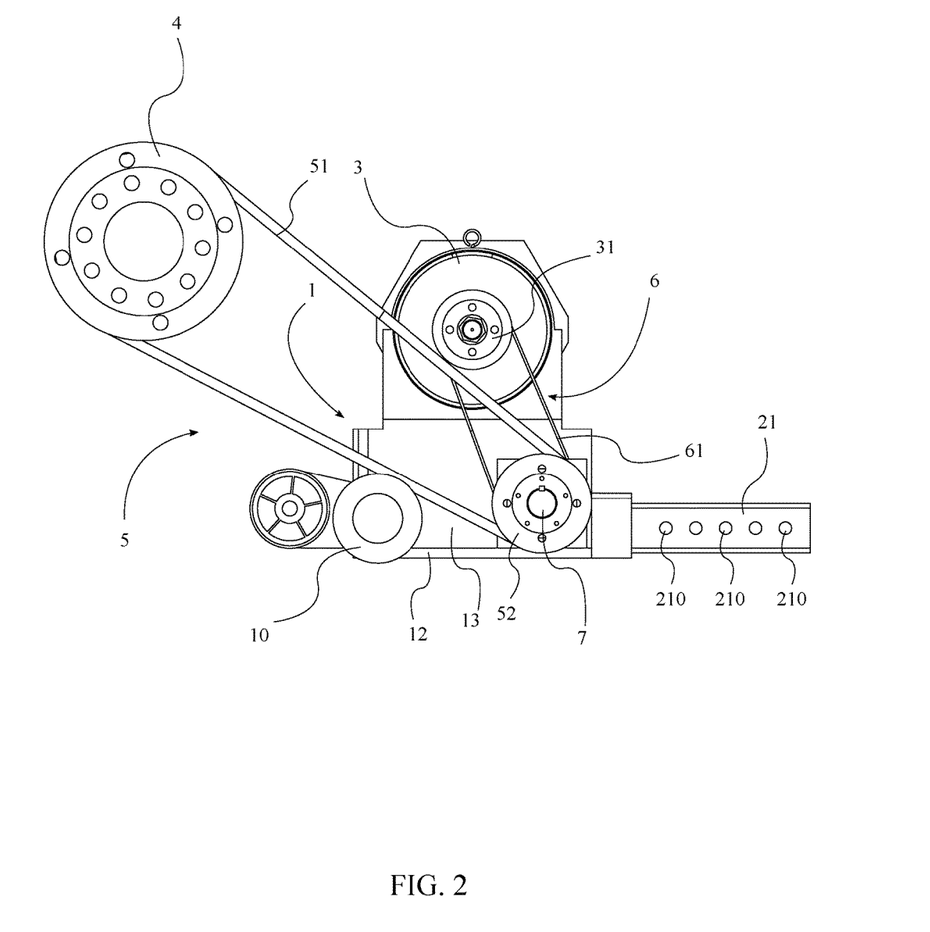
FIG. 2 is a front view of the present invention.
Figure 3:
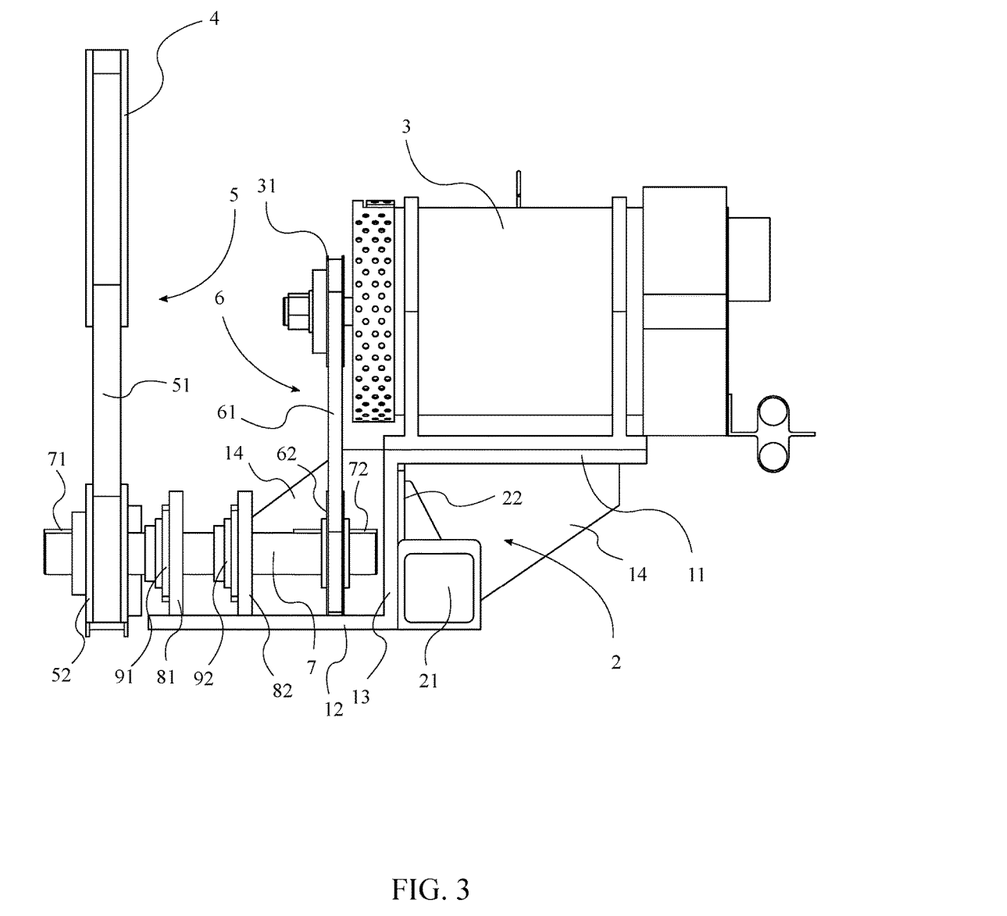
FIG. 3 is a side view of the present invention.
Figure 4:
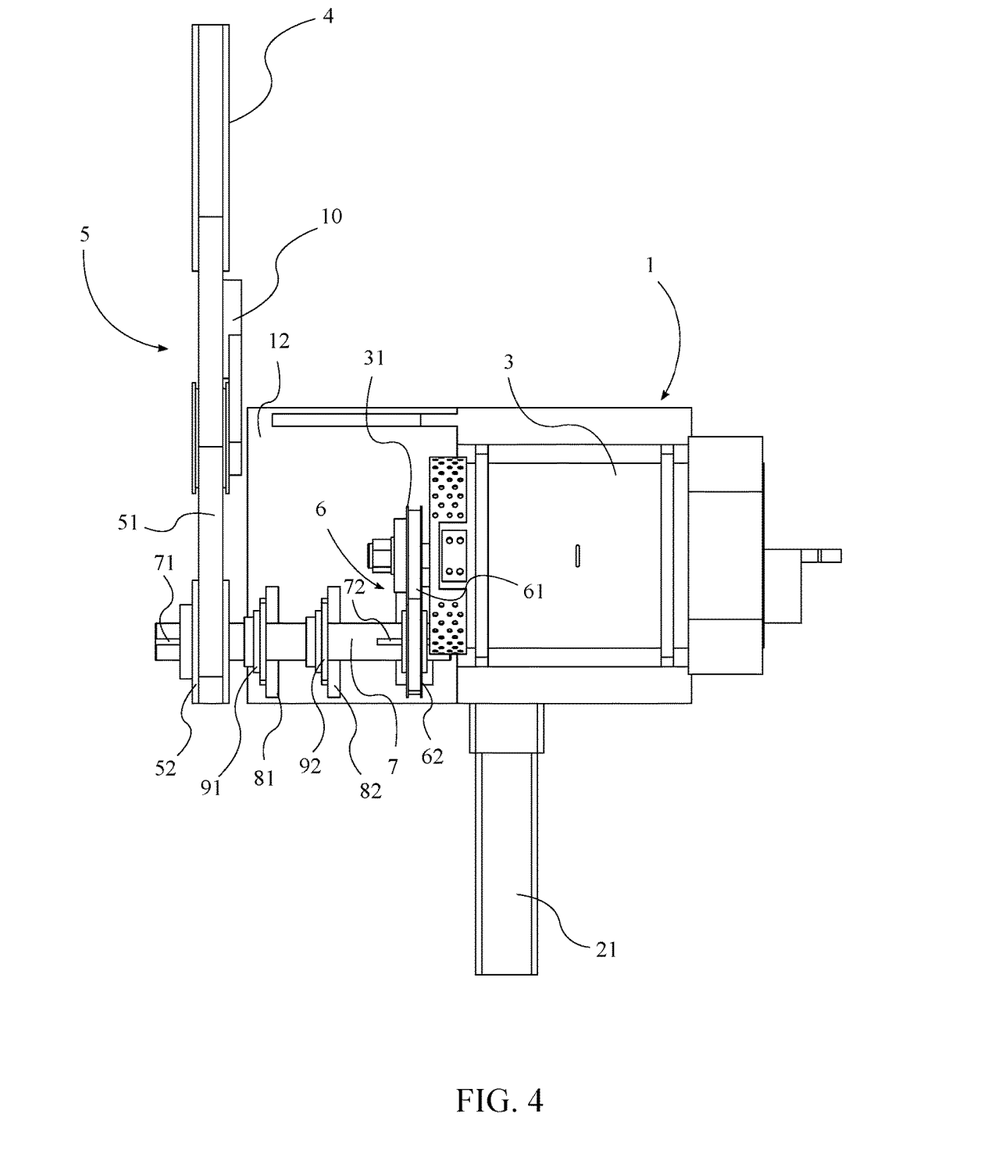
FIG. 4 is a top view of the present invention.
Figure 5:
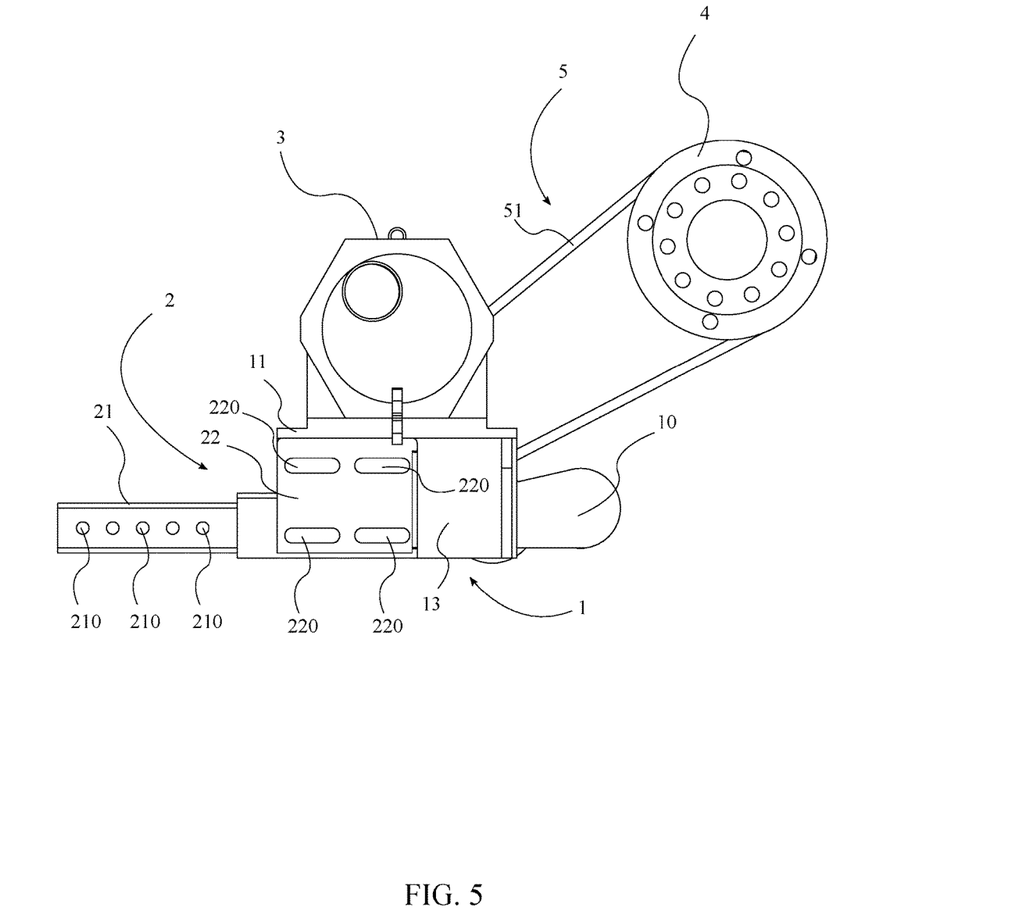
FIG. 5 is a rear view of the present invention.
Figure 7:
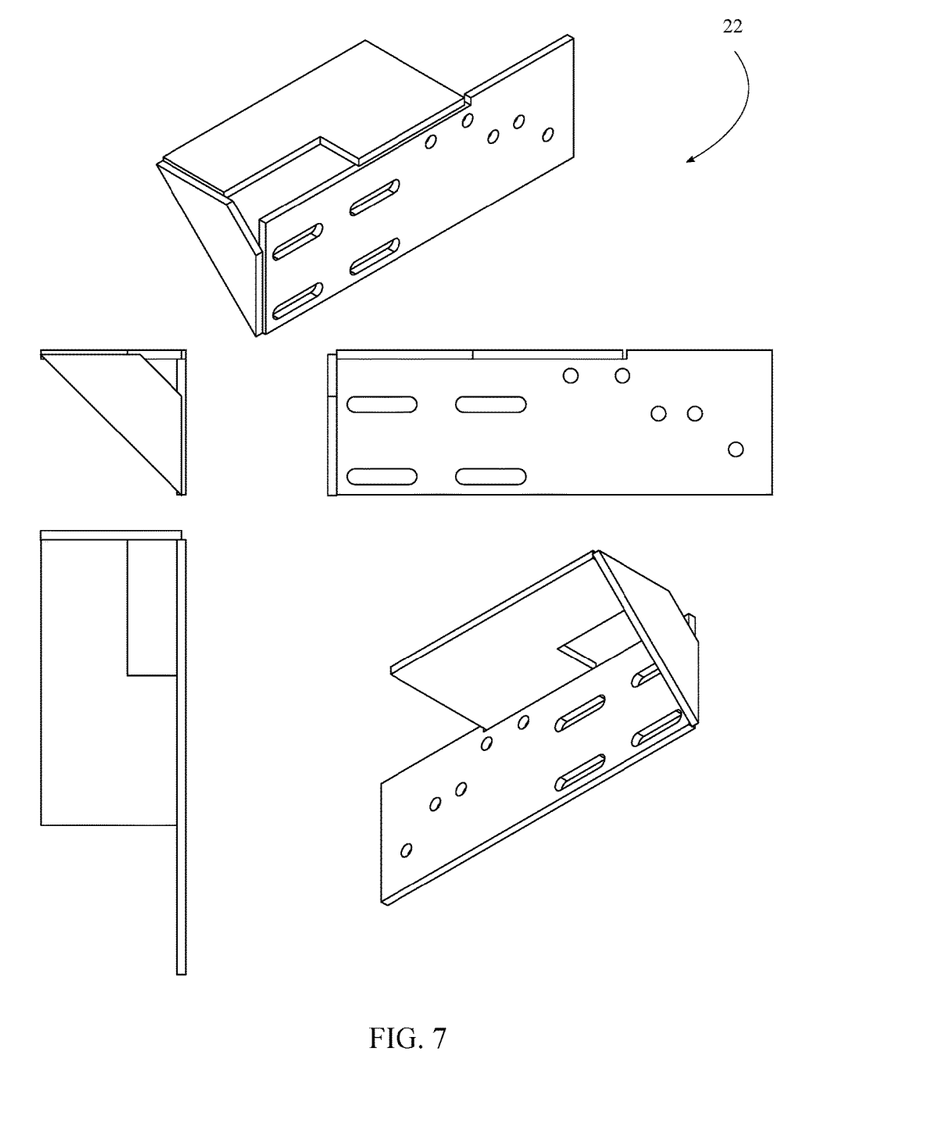
FIG. 7 shows several views of a first embodiment of the adjustment bracket of the mounting bracket.
Figure 8:
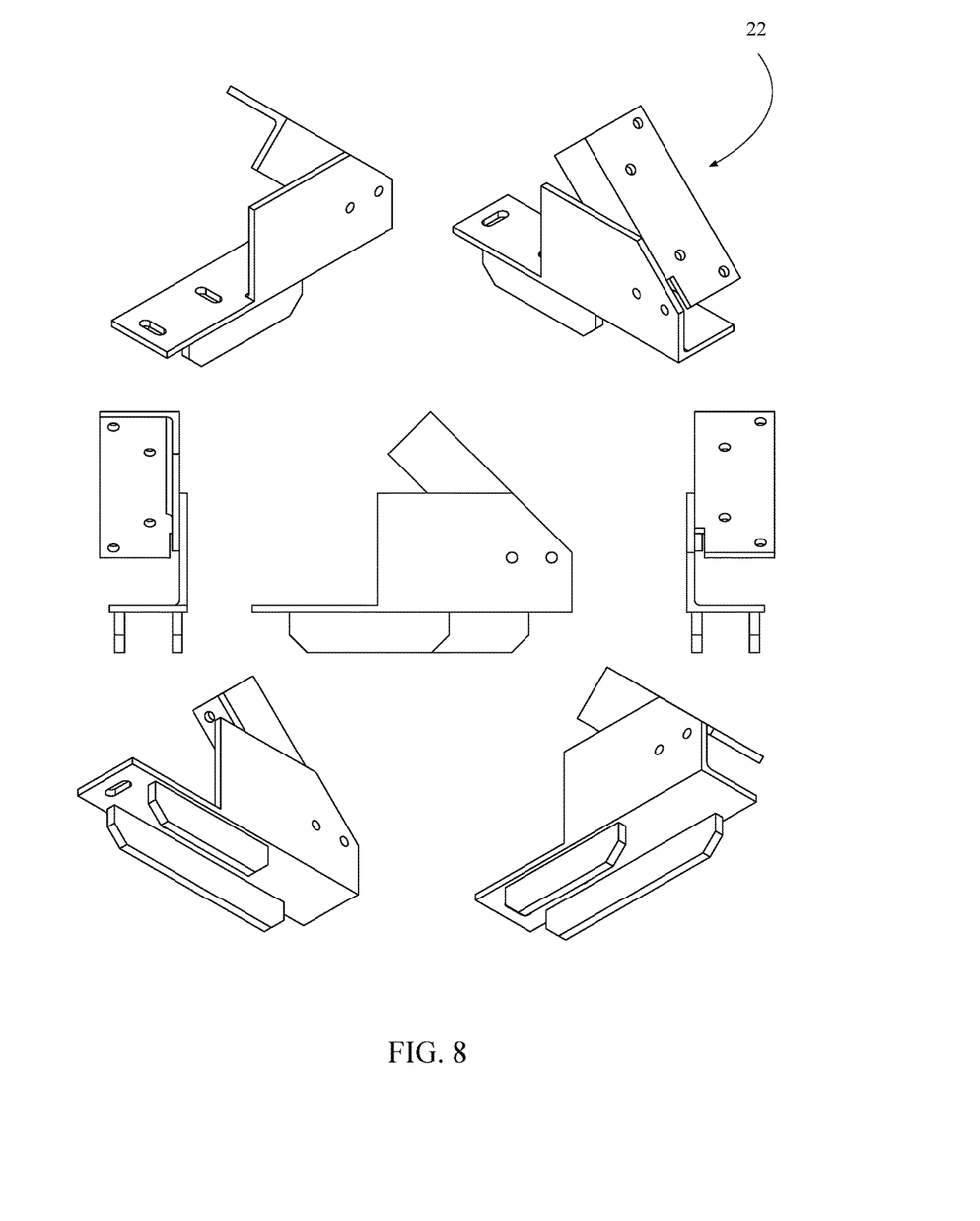
FIG. 8 shows several views of a second embodiment of the adjustment bracket of the mounting bracket.

The mounting bracket 2 allows the present invention to be connected to a vehicle frame. Referring to FIG. 5, in one embodiment, the mounting bracket 2 comprises a mounting hitch 21 and an adjustment bracket 22. The mounting hitch 21 is an elongated member, generally rectangular in cross section, comprising a plurality of holes 220 that traverse laterally through the mounting hitch 21 and are linearly distributed along the mounting hitch 21. The mounting hitch 21 is configured to be inserted into a sheath connected to the vehicle frame, the sheath comprising a corresponding number of holes. One or more bolts is affixed through one or more of the holes in the sheath and one or more of the plurality of holes 220 in the mounting hitch 21, affixing the mounting hitch 21 within the sheath. The plurality of holes 220 allows for a range of insertion distance of the mounting hitch 21 within the sheath for position adjustment. The mounting hit is connected adjacent to the adjustment bracket 22. The adjustment bracket 22 is a generally flat, rectangular structural member, comprising a plurality of slots 220. The plurality of slots 220 traverses through the adjustment bracket 22, and are distributed across the adjustment bracket 22. In one embodiment, the plurality of slots 220 comprises four slots, which are arranged on the adjustment bracket 22 in a geometrically rectangular fashion. The adjustment bracket 22 is connected to the vertical portion 13 of the support frame 1 opposite the pulley system by a plurality of fasteners, such as, but not limited to bolts, each fastener traversing through one of the plurality of slots 220 into fastener receiving holes in the vertical portion 13 of the support frame 1. The slots are oriented parallel to the mounting hitch 21, and the horizontal alignment of the support frame 1 with the adjustment bracket 22 may be changed by changing the position of the bolts within the plurality of slots 220. FIG. 7 shows several views of a variation of the adjustment bracket shown in FIG. 5, which is a first embodiment of the adjustment bracket 22. FIG. 8 shows several views of a second embodiment of the adjustment bracket 22. The first embodiment of the adjustment bracket 22 shown in FIGS. 5 and 7 is designed to interface with a "spring style" vehicle frame or suspension. The second embodiment of the adjustment bracket 22 shown in FIG. 8 is designed to interface with an "air", "air ride" or "airbag" vehicle frame or suspension. It is contemplated that the components shown in FIGS. 7-8 may alternatively encompass the entirety of the mounting bracket 2 in some embodiments, if the application or the situation calls for such a variation.

One embodiment of the present invention further comprises a belt tensioner 10. The belt tensioner 10 is engaged with the first pulley belt 51 of the first pulley system. The belt tensioner 10 may be mounted to the support frame 1, or to the vehicle frame, or to any available location that allows the belt tensioner 10 to be engaged with the first pulley belt 51. In one embodiment, the belt tensioner 10 comprises a first and second cylindrical body. The belt tensioner 10's first cylindrical body has a cut along the top surface of the cylindrical body. The first and second cylindrical body is connected through a base component. The belt tensioner 10 is a device that applies a force to create and maintain tension on the first pulley belt 51. In the preferred embodiment of the present invention, the belt tensioner 10 is located between the input wheel 4 and the first pulley wheel 52, and pushes on the top outer surface of the first pulley belt 51. In alternate embodiments of the present invention, the belt tensioner 10 can be located differently around the first pulley belt 51 as long as the belt tensioner 10 provides creates and maintains tension on the first pulley belt 51.

The following is a supplemental description of the present invention. The following description should not be regarded as limiting, and is intended solely as a supplemental description of one exemplary embodiment to supplement the above description of the present invention to further demonstrate the spirit of the present invention and various other details of one exemplary embodiment of the present invention.

The present invention is a wheel powered alternator charging system that harnesses energy from the rotation of a semi-tractor trailer wheel and converts the mechanical rotational energy into electrical energy through a system of pulleys and alternators. The design allows the continuous charging of a Lithium battery that powers a DC motor that runs a refrigeration unit on a semi-tractor trailer. The alternator provides sufficient amps to run the DC motor, and the excess amps charges the battery. The device allows zero emission charging of an electrical system. The wheel powered alternator charging system can be adapted for use in different electrical systems (not specifically refrigeration units) and can be configured for mounting on different semi-tractor trailers on different sets of trailer wheels. The electrical system is quiet enough to be used in quiet zone areas and is durable in order to work well in any foul weather such as snow. Before explaining at least one embodiment of the present invention in detail, it is to be understood that the invention is not limited in its application to the details of the components and arrangements as described or illustrated. The invention is capable of other embodiments and of being utilized and carried out in various ways. It is also to be understood that the phrasing and terminology employed herein are for the purpose of description and should not be regarded as limiting. As such, the present invention is primarily used for the purpose of charging an electrical system by means of a system of pulleys, belts, and an alternator attached to one set of wheels of a semi-tractor trailer.

In the preferred embodiment, the present invention comprises of a main frame, a driven pulley assembly, a wheel drive pulley, a gear ratio shaft, a belt tensioner, a v-belt, a bearing kit, and an alternator. The main frame is the component that houses the components and is attached to the underneath of a semi-tractor trailer. The driven pulley assembly is mounted on the main frame through the gear ratio shaft which is inserted through the bearing kit which is mounted on the main frame. Then, the wheel drive pulley is connected to the driven pulley assembly through the v-belt. The belt tensioner can be mounted to the main frame or semi-tractor trailer frame and is connected to the v-belt. The alternator is mounted on the main frame. The wheel drive pulley is attached to the semi-tractor trailer wheel. When the semi-tractor trailer wheel rotates when the truck is driven, the wheel drive pulley rotates with the semi-tractor trailer wheel. The wheel drive pulley turns a belt which turns the driven pulley assembly. The driven pulley assembly and gear ratio shaft transfers the rotational energy to the alternator through a belt. Then, the alternator converts the mechanical rotational energy to electrical energy. The energy from the alternator is used to charge a battery that powers the motor that runs the refrigeration unit.

In the preferred embodiment of the present invention, the main frame comprises of an alternator mount, a driven pulley system mount, and a receiver tube. The alternator mount rests on the top portion of the main frame. Adjacent and below the alternator mounts is the drive pulley system mount. Directly below the alternator mount is the receiver tube. The components of the main frame are welded together. However, in alternative embodiments of the device, the components of the main frame can be attached by different means such as bolts and nuts.

The alternator mount further comprises of a flat rectangular base, a first alternator stand mount, a second alternator stand mount, a plurality of through straight slot cuts, a tab with a through-hole, and a first triangular wall. The first alternator stand mount and second alternator stand mount extend upward from the top surface of the flat rectangular base. The first and second alternator stand mounts each have a rectangular bottom half and a semi-circular top half. There is a first and second alternator through hole in the center faces of the first and second alternator stand mounts. The front faces of the first alternator stand mount, second alternator stand mount, and flat rectangular base are all parallel with each other. The front faces of the tab with a through-hole and first triangular wall are perpendicular to the front face of the flat rectangular base. The tab with a through-hole extends upward from the top surface and is centered on the left edge of the flat rectangular base. The first triangular wall is in the shape of a right triangle. The first triangular wall extends downward on the bottom surface and left side of the flat rectangular base. The first triangular wall is oriented such that the 90 degrees angled corner of the first triangular wall is coincident with the front-bottom edge of the flat rectangular base. The plurality of through straight slot cuts are oriented in such a way that there are two adjacent through straight slot cuts on top surface of the flat rectangular base behind both the first and second alternator stand mounts.

The driven pulley mount further comprises of a second rectangular base, a first pulley stand, a second pulley stand, a rectangular through cut, and a second triangular wall. The first pulley stand and second pulley stand are rectangular have a rectangular body with a straight slot cut oriented upward from the center of the rectangular body to the top of the rectangular body. Additionally, the first pulley stand and second pulley stand have a plurality of holes located on the corners of the rectangular bodies. The front faces of the second rectangular base, first pulley stand, and second pulley stand are parallel to each other. The first pulley stand and second pulley stand are offset toward the right side of the second rectangular base and extend upward from the top surface of the second rectangular base. The second pulley stand is located behind the first pulley stand. Behind the second pulley stand, there is a rectangular through cut from the top to bottom surfaces of the rectangular base. The second triangular wall is located on the left side of the second rectangular base. The second triangular wall is in the shape of a right triangle with the 90 degree angled corner coincident with the top back edge of the second rectangular base.

The receiver tube consists of an L-shaped base with a square tube extending from the left side of the L-shaped base. The back wall of the L-shaped based has straight slot cuts through the back wall. The square tube has a plurality of through holes linearly patterned along the central horizontal axis along the square tube. The receiver tube is attached on the bottom surface of the main frame below the alternator mount. The receiver tube is used to mount the device onto the semi-tractor trailer. In alternate embodiment of the present invention, the receiver tube does not have an extending square tube, but an extending back wall. The receiver tubes can be of different designs in order to accommodate to different mounting requirements such that of an air bag suspension system of a semi-tractor trailer.

The driven pulley assembly further comprises of a driven pulley, an alternator pulley, and a thin belt. The driven pulley further comprises of a circular body, a first plurality of holes, a through-hole with square key, a cut for a v-belt, and a hub. The through hole with square key is located in the center of the circular body. The first plurality of holes is circularly patterned and equally spaced above and around the through hole with square key that extend from the front to back surfaces of circular body. In addition, there is the cut around the top surface of the circular body in order to encompass a v-belt. Then, on the front surface of the circular body there is the second plurality of holes that extend only half way through the circular body. The second plurality of holes are circularly patterned and equally spaced between the through hole with square key and plurality of holes. The hub is concentric and parallel to the driven pulley. The hub has a plurality of holes that are concentric with the second plurality of holes in order for the hub to be attached to the driven pulley. The alternator pulley comprises of a cylindrical body with a through hole. The alternator pulley front face is parallel to front face of the driven pulley. Additionally, the driven pulley and alternator pulley are concentric. The thin belt is a continuous band of material with a primarily rectangular cross section. The thin belt links the alternator pulley to the alternator.

The bearing kit comprises of a first square body and a second square body. The first and second square body have a centered circular extrusion on the top surfaces of the first and second square bodies. Then, there is a first and second through-hole centered on the first and second square bodies that extend through both the square bodies and circular extrusions. Additionally, there are holes located on the corners of the circular bodies that are concentric with the plurality of holes on the first and second pulley stands.

The gear ratio shaft is an elongated cylinder with square key holes on both the front and back surfaces of the cylinder that both extend inward toward the center of the center of the cylinder. The gear ratio shaft is inserted through the driven wheel pulley bearing kit, driven pulley mounts, and alternator pulley. There is a square key that inserted through the square key holes on the gear ratio shaft, driven pulley, and alternator pulley. The square key and square key hole forces the driven pulley to properly transfer the rotational motion from the driven pulley to the gear ratio shaft to the alternator pulley.

The wheel drive pulley is a circular body with a large through hole located in the center of the circular body. Above and around the through hole is a plurality of holes circularly patterned and equally spaced. The circular body has a cut that encircles the top surface of the circular body in order for a v-belt to be wrapped and secured around the circular body. The v-belt is a continuous band of material with a primarily trapezoidal or rectangular cross section. The v-belt connects the wheel drive pulley and driven pulley.

The belt tensioner comprises of a first and second cylindrical body. The belt tensioner first cylindrical body has a cut along the top surface of the cylindrical body. The first and second cylindrical body is connected through a base component. The belt tensioner is a device that applies a force to create and maintain tension on the v-belt. In the preferred embodiment of the present invention, the belt tensioner is located between the wheel drive pulley and driven pulley and pushes on the top outer surface of the v-belt.

In alternate embodiments of the present invention, the belt tensioner can be located differently around the v-belt as long as the belt tensioner provides creates and maintains tension on the v-belt.

The alternator is an electrical generator that converts mechanical energy to electrical energy. In the preferred embodiment of the present invention, the alternator comprises of a cylindrical body with an extruded axle and pulley on the flat front surface of the cylindrical body. The cylindrical body is inserted between the through holes of the first and second alternator stand mounts. The pulley is attached to the extruded axle and the thin belt connects the alternator pulley to the pulley on the alternator. In alternate embodiments of the present invention, the alternator can be different shapes and size and so the first and second alternator stand mounts will be altered in order to properly mount and secure the alternator to the main frame.

Although the invention has been explained in relation to its preferred embodiment, it is to be understood that many other possible modifications and variations can be made without departing from the spirit and scope of the invention as hereinafter claimed.

What is claimed is:

1. A wheel powered alternator charging system comprises:
    a support frame;
    a mounting bracket;
    an alternator;
    an input wheel;
    a first pulley assembly;
    a second pulley assembly;
    a transfer shaft;
    at least one shaft support;
    at least one bearing;
    the alternator comprises an alternator wheel;
    the alternator being mounted to the support frame;
    the mounting bracket being connected to the support frame opposite the pulley system;
    the first pulley assembly being rotationally engaged between the input wheel and the transfer shaft;
    the second pulley assembly being rotationally engaged between the alternator wheel and the transfer shaft opposite the first pulley assembly along the transfer shaft, wherein the input wheel is rotationally engaged with the alternator wheel through the first pulley assembly, the transfer shaft, and the second pulley assembly;
    each of the at least one shaft support being connected to the support frame;
    each of the at least one bearing being connected within one of the at least one shaft support; and
    the transfer shaft being rotationally engaged within each of the at least one bearing, wherein the transfer shaft is supported on the support frame by the at least one bearing and the at least one shaft support.

2. The wheel powered alternator charging system as claimed in claim 1 comprises:
    the support frame comprises an upper portion, a lower portion, and a vertical portion;
    the upper portion being perpendicularly connected to the vertical portion;
    the lower portion being perpendicularly connected to the vertical portion opposite the upper portion along the vertical portion;
    the alternator being mounted to the upper portion;
    each of the at least one shaft support being perpendicularly connected to the lower portion; and
    the mounting bracket being connected to the vertical portion opposite the lower portion, between the upper portion and the lower portion.

3. The wheel powered alternator charging system as claimed in claim 1 comprises:
    the first pulley assembly comprises a first pulley belt and a first pulley wheel;
    the second pulley assembly comprises a second pulley belt and a second pulley wheel;
    the first pulley wheel being concentrically connected to the transfer shaft;
    the first pulley belt being operatively connected between the input wheel and the first pulley wheel;
    the second pulley wheel being concentrically connected to the transfer shaft opposite the first pulley wheel; and
    the second pulley belt being operatively connected between the second pulley wheel and the alternator wheel.

4. The wheel powered alternator charging system as claimed in claim 1 comprises:
    the diameter of the input wheel having a 20 to 8 ratio to the diameter of a first pulley wheel.

5. The wheel powered alternator charging system as claimed in claim 1 comprises:
    the diameter of a second pulley wheel having a 6 to 3 ratio to the diameter of the alternator wheel.

6. The wheel powered alternator charging system as claimed in claim 1 comprises:
    a first axis of the input wheel, a second axis of the transfer shaft, and a third axis of the alternator wheel being oriented parallel to each other;.

7. The wheel powered alternator charging system as claimed in claim 1 comprises:
    the at least one shaft support comprises a first shaft support and a second shaft support;

the at least one bearing comprises a first bearing and a second bearing;

the first bearing being connected within the first shaft support; and the second bearing being connected within the second shaft support.

8. The wheel powered alternator charging system as claimed in claim 1 comprises:

a first pulley wheel and a second pulley wheel; and the first pulley wheel and the second pulley wheel being rotationally fixed to the transfer shaft.

9. The wheel powered alternator charging system as claimed in claim 8 comprises:

the first pulley wheel comprises a first groove;

the second pulley wheel comprises a second groove;

the transfer shaft comprises a first protrusion and a second protrusion;

the first protrusion and the second protrusion being laterally positioned on the transfer shaft axially opposite each other along the transfer shaft;

the first groove axially and internally traversing through the first pulley wheel;

the second groove axially and internally traversing through the second pulley wheel;

the first protrusion being positioned within the first groove; and the second protrusion being positioned within the second groove.

10. The wheel powered alternator charging system as claimed in claim 1 comprises:

the mounting bracket comprises a mounting hitch and an adjustment bracket;

the mounting hitch comprises a plurality of holes;

the adjustment bracket comprises a plurality of slots;

the mounting hitch being connected adjacent to the adjustment bracket;

the plurality of holes traversing through the mounting hitch;

the plurality of holes being linearly distributed along the mounting hitch;

the plurality of slots being distributed across the adjustment bracket; and the adjustment bracket being connected to a vertical portion of the support frame by a plurality of fasteners traversing through the plurality of slots into the vertical portion.

11. The wheel powered alternator charging system as claimed in claim 1 comprises:

a belt tensioner; and the belt tensioner being engaged with a first pulley belt of the first pulley system.

* * * * *